United States Patent
Kosaka et al.

(10) Patent No.: US 6,307,678 B2
(45) Date of Patent: *Oct. 23, 2001

(54) IMAGE SHAKE CORRECTION DEVICE FOR OPTICAL APPARATUS AND OPTICAL APPARATUS HAVING IMAGE SHAKE CORRECTION DEVICE

(75) Inventors: Akira Kosaka, Yao; Junichi Tanii, Izumi; Yoshihiro Hara, Kishiwada; Yoshiharu Tanaka, Kawachinagano; Shoichi Minato, Sakai, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/320,892

(22) Filed: May 27, 1999

(30) Foreign Application Priority Data

May 28, 1998 (JP) .................................................. 10-162825

(51) Int. Cl.[7] ............................. G02B 27/64; G03B 17/00
(52) U.S. Cl. .......................... 359/557; 359/554; 359/831; 396/52; 396/55
(58) Field of Search ..................................... 359/554–557, 359/834–837, 813–814, 823–824; 396/52–55; 348/208

(56) References Cited

U.S. PATENT DOCUMENTS

| 5,150,702 | * | 9/1992 | Miyanaga et al. ........................ 128/6 |
| 5,305,040 | * | 4/1994 | Enomoto ............................... 359/554 |
| 5,398,132 | * | 3/1995 | Otani .................................... 359/557 |
| 5,589,239 | * | 12/1996 | Tomono et al. ....................... 359/831 |
| 5,768,016 | | 6/1998 | Kanbara ............................... 359/557 |
| 6,157,779 | * | 12/2000 | Kosaka et al. .......................... 396/55 |

FOREIGN PATENT DOCUMENTS

| 06-018954 | 1/1994 | (JP) . |
| 06-175076 | 6/1994 | (JP) . |
| 10-090745 | 4/1998 | (JP) . |

* cited by examiner

Primary Examiner—Thong Nguyen
(74) Attorney, Agent, or Firm—Morrison & Foerster LLP

(57) ABSTRACT

An image shake correction device for correcting image shake on the focal plane of an optical apparatus due to vibration of the optical apparatus such as a camera. A correction optical element is provided in the optical path of the principal optical system, the correction optical element is driven correspondingly to the detected image shake magnitude, and the image shake on the focal plane of an optical apparatus is corrected. A driving mechanism which utilizes shape memory alloy is used for driving a correction lens for correcting image shake.

34 Claims, 13 Drawing Sheets

IMAGE SHAKE CORRECTION DEVICE FOR OPTICAL APPARATUS AND OPTICAL APPARATUS HAVING IMAGE SHAKE CORRECTION DEVICE

This application is based on application No. 10-162825 filed in Japan, the contents of which are hereby incorporated by reference.

BACKGROUND OF THE INVENTION

1. Field of the Invention

This invention relates to an image shake correction device for correcting the image shake on the image focal plane of an optical apparatus due to vibration of an optical apparatus such as a camera, and an optical apparatus provided with the image shake correction device.

2. Description of the Prior Art

Heretofore, in the camera industry field, a correction optical system which drives a correction lens, which is located behind the photographic lens, eccentrically in a plane perpendicular to the optical axis has been known as a means for correcting the image shake on the image forming plane due to camera vibration caused during photographic activity. In the lens device provided with a correction optical system, an actuator used exclusively for driving the correction lens in a predetermined direction is incorporated, the movement of a camera is detected by means of a camera shake sensor such as an angular acceleration sensor, and the correction lens is driven based on the detected signal.

The piezoelectric actuator has been proposed which utilizes a phenomenon that a driven member coupled frictionally with a driving shaft moves in a predetermined direction with repeated reciprocal vibration when the driving shaft is vibrated reciprocally in different speed by a piezoelectric transducer which is serves as the actuator for driving such a correction optical system. This structure can drive eccentrically the correction lens having a holder frame coupled with the driven member of the piezoelectric actuator in a plane perpendicular to the optical axis (refer to Japanese Laid Open Patent No. Hei 8-43872 as an example).

Also, the prior art recognises a moving coil type of actuator which has two electromagnetic coils in a plane perpendicular to the optical axis provided on a holder frame of a correction lens and has a yoke and a permanent magnet located correspondingly to the two electromagnetic coils provided on a fixed frame of a lens barrel.

The above-mentioned piezoelectric actuator and moving coil type actuator are suitable for the correction lens driving mechanism for correcting image shake because of excellent controllability, however, these driving mechanisms are large and heavy to result in a large-sized and expensive optical apparatus as a whole, therefore a compact and light-weight correction lens driving mechanism has been desired to be realized.

SUMMARY OF THE INVENTION

It is an object of the present invention to provide a novel image shake correction device for correcting image shake on the focal plane of an optical apparatus caused by vibration of the optical apparatus and to provide an optical system having the image shake correction device.

It is another object of the present invention to provide a compact and light-weight image correction device having a driving mechanism which utilizes a shape memory alloy as the driving mechanism for driving an image shake correction optical element located in the optical path of the principal optical system of the optical apparatus and to provide an optical system having the image shake correction device.

It is yet another object of the present invention to provide a method for correcting image shake by heating a shape memory alloy of the driving mechanism, which is employed as the driving mechanism for driving an image shake correction optical element located in the optical path of the principal optical system of an optical apparatus.

It is still another object of the present invention to provide an optical apparatus having an image shake correction device applying said method for correcting image shake.

Other objects of the present invention will be clear from the detailed description of the present invention with reference to the attached drawings.

DETAILED DESCRIPTION OF THE PREFERRED EMBODIMENTS

The preferred embodiments of the present invention will be described hereinafter.

First Embodiment

Figure 1:
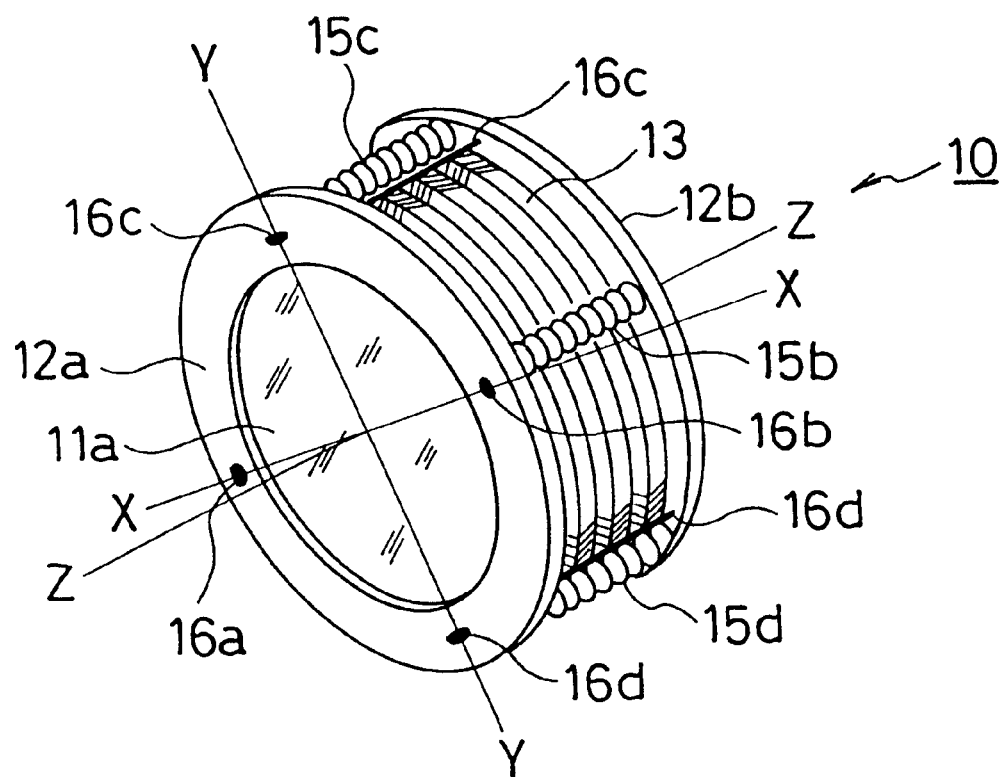
FIG. 1 is a perspective view for illustrating an appearance of an image shake correction optical unit in accordance with the first embodiment.
Figure 2:
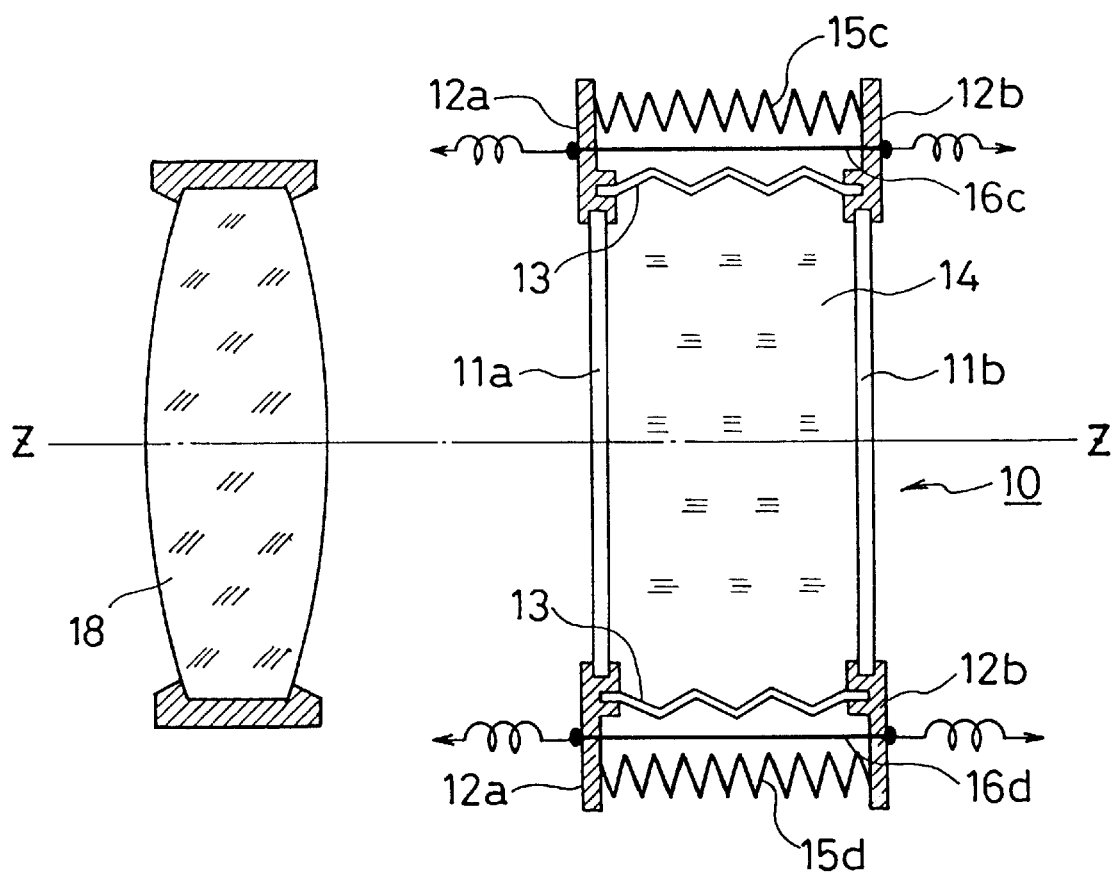
FIG. 2 is a cross sectional view along the axis Y—Y of the image shake correction optical unit shown in FIG. 1.

The first embodiment involves an exemplary image shake correction device applied to a camera, FIG. 1 is a perspective view for illustrating the appearance of an image shake correction optical unit 10, and FIG. 2 is a cross sectional view along Y—Y axis in FIG. 1. 18 denotes a photographic lens which represents the principal optical system, and the correction optical unit 10 is located in the optical path of the principal optical system 18.

In FIG. 1 and FIG. 2, the correction optical unit 10 comprises flat plates 11a and 11b consisting of transparent material which is suitable for the optical element, holder frames 12a and 12b for supporting the flat plates 11a and 11b, a cylindrical diaphragm 13 which defines a closed space, and a liquid transparent synthetic resin filler 14 filled in the internal of the closed space which is suitable for the optical element.

A plurality of elastic members 15 such as coil springs (referred to as 15a to 15d hereinafter) for pressing the holder frames 12a and 12b so as to widen the distance between the holder frames 12a and 12b are provided on the periphery of the supporting frames 12a and 12b at a plurality of positions where the periphery is angularly divided into equal predetermined angular intervals (for example, 90 degrees or 120 degrees), and the holder frames 12a and 12b are combined with each other with shape memory alloy wires 16 (referred to as 16a to 16d hereinafter) located near the respective plurality of elastic members.

Herein only for the purpose of description, it is assumed in the following description that the periphery of the holder frames 12a and 12b are divided into 90 degree intervals and an orthogonal coordinate system having Z-axis coincident with the optical axis is introduced, the elastic members 15a and 15b and the shape memory alloy wires 16a and 16b are located on the plane including X-axis, and the elastic members 15c and 15d and the shape memory alloy wires 16c and 16d are located on the plane including Y-axis.

Shrink shape of a predetermined size is memorized in the shape memory alloy wires 16a to 16d. When an current is supplied to the shape memory alloy wires to heat to a predetermined temperature, the wires are restored to the memorized original shape. Because the size of the wires after restoration depends on the temperature, the size of the shape memory alloy wires after restoration is controlled by the current value of an electric current namely controlled factor, such as the heating temperature.

In the structure described herein, the shape memory alloy wires 16a to 16d, when no current is supplied to wires 16a to 16d, receives a tensile force due to pressing force in the direction to widen the distance between the holder frame 12a and 12b of the elastic members 15a to 15d, and the initial condition that the elastic force of the elastic members 15a to 15d balances the tension of the wires 16a to 16d is maintained. FIG. 2 shows a cross sectional view of the correction optical unit 10 in the initial condition.

Figure 3:
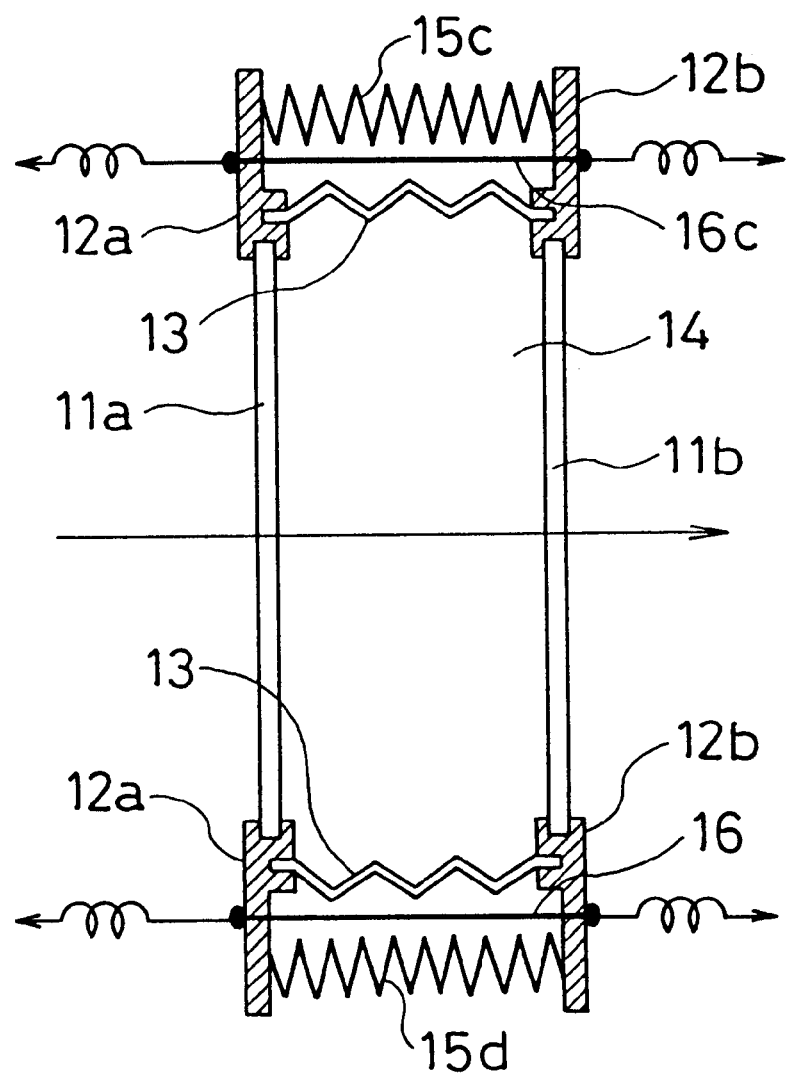
FIG. 3 is a cross sectional view of the correction optical unit which is in standby condition.

Next, when first currents of the same current value are supplied to the plurality of shape memory alloy wires 16a to 16d for heating from a control circuit, which will be described hereinafter, in order to set the standby position, the shape memory alloy wires 16a to 16d are shrunk to the shape of memorized standby position against the elastic force of the elastic members 15a to 15d. FIG. 3 shows a cross sectional view of the correction optical unit 10 in the standby condition.

At this time, the flat plates 11a and 11b consisting of transparent material remain perpendicular to the optical axis and parallel each other because the displacement of the plurality of shape memory alloy wires 16a to 16d is equal each other, therefore the incident light which passes into the correction optical unit 10 is allowed to pass without refraction.

Figure 4:
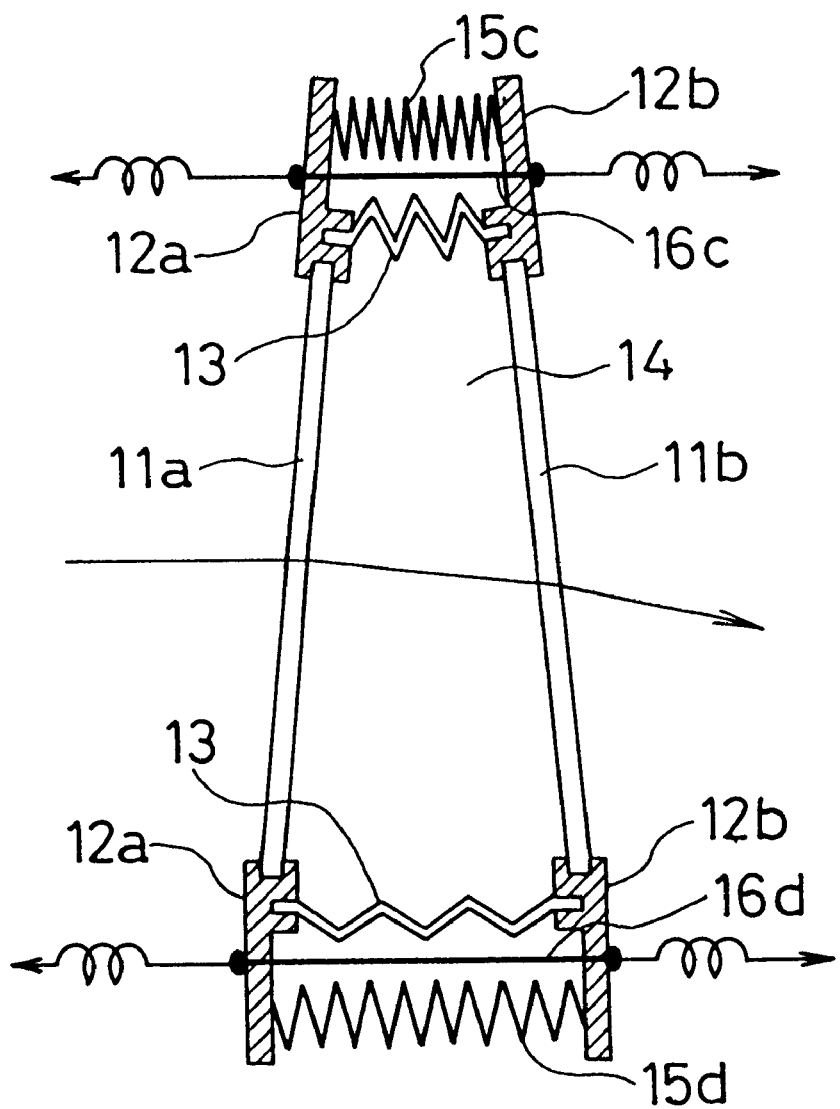
FIG. 4 is a cross sectional view of the correction optical unit which is correcting image shake.

Next, electric currents different in current value are supplied from the control circuit, which will be described hereinafter, to heat the plurality of shape memory alloy wires 16a to 16d based on image shake correction signal. In detail, for example, an electric current of a second current value which is larger than the first current value is supplied to the shape memory alloy wire 16c disposed on the upper side in Y-axis direction, an electric current of the first current value is supplied to the shape memory alloy wire 16d disposed on the under side in Y-axis direction, and an electric current of a third current value which is intermediate between the first current value and the second current value is supplied to the shape memory alloy wires 16a and 16b disposed on the right and left side in X-axis direction, and at this time, the shape memory alloy wires 16a to 16d are restored respectively to the memorized shape of sizes corresponding to the respective current values, as the result, the flat plates 11a and 11b consisting of the transparent material of the correction optical unit 10 are changed to a deformed shape having the shorter length at the upper side. FIG. 4 shows a cross sectional view of the correction optical unit 10 in an image shake correction condition in which the flat plates 11a and 11b consisting of the transparent material of the correction optical unit 10 are positioned close to each other at the upper side in Y-axis direction.

The incident light which passes into the correction optical unit 10 is refracted in the plane including Y-axis when passing as shown in FIG. 4, and the image shake is corrected.

Figure 5:
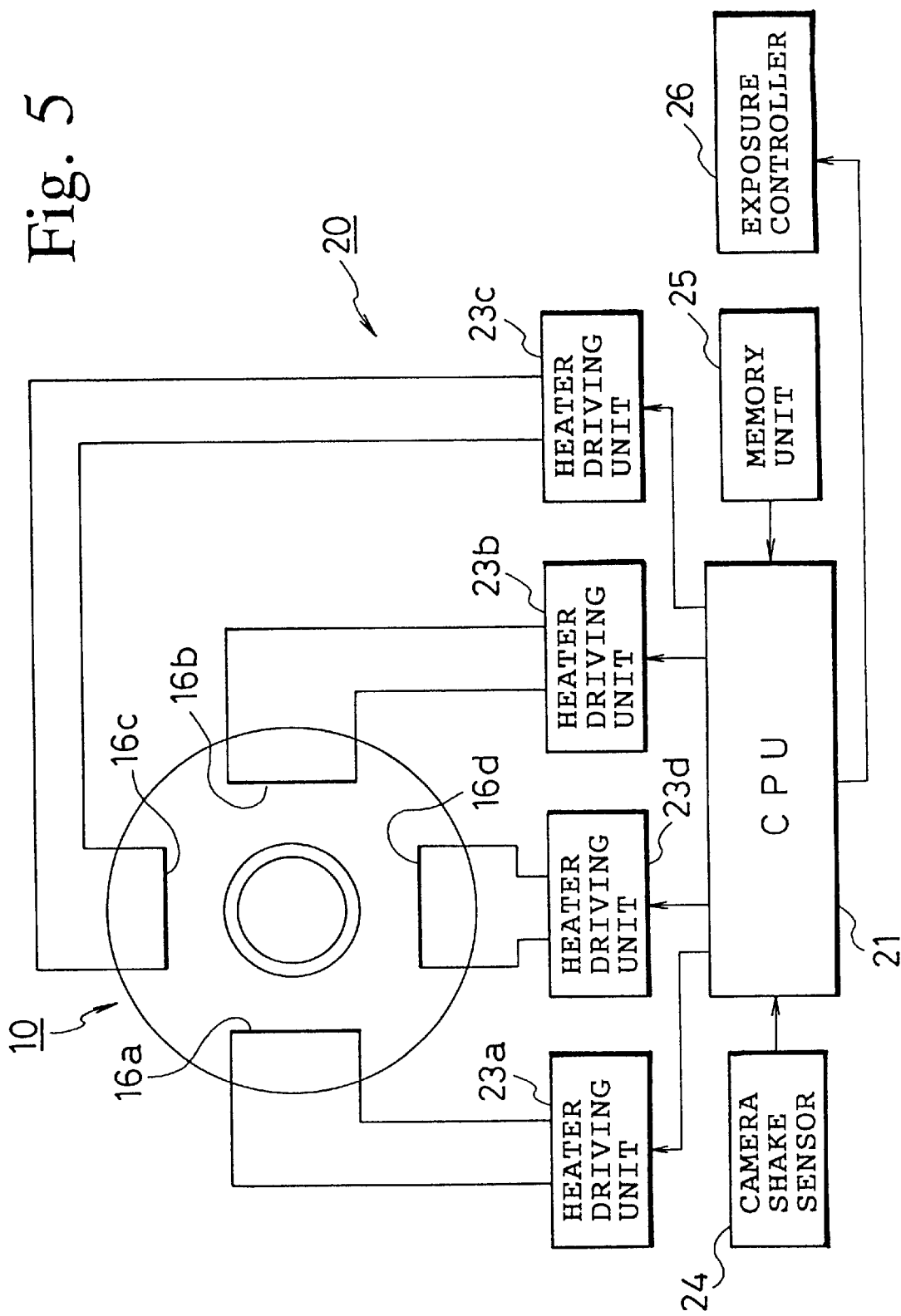
FIG. 5 is a block diagram for illustrating the structure of a control circuit for controlling the image shake correction optical unit in accordance with the first embodiment.

FIG. 5 is a block diagram for illustrating the structure of the control circuit 20 for controlling the correction optical unit. The control circuit 20 has a CPU 21 as a main component, a camera shake sensor 24, a memory unit 25, and an exposure controller 26 are connected to the input/output port of the CPU 21 and heater driving units 23a to 23d for heating the respective shape memory alloy wires 16a to 16d are connected to the output port of the CPU 21. A CPU for controlling the optical apparatus, not shown in the drawing, may also be served as the CPU 21 or a CPU exclusively used for correction optical unit may be provided as the CPU 21.

Current value data for heating corresponding to the image shake magnitude is stored in the memory unit 25. The relation between the current value to be supplied to the shape memory alloy wire and the deformation length of the memorized shape is previously measured and further the deformation length of the shape memory alloy wire corresponding to the inclination angle (refraction angle) of the flat plates 11a and 11b, namely the image shake correction magnitude, is determined previously, and a current value corresponding to an image shake correction magnitude detected by the camera shake sensor 24 is thereby determined.

Figure 6:
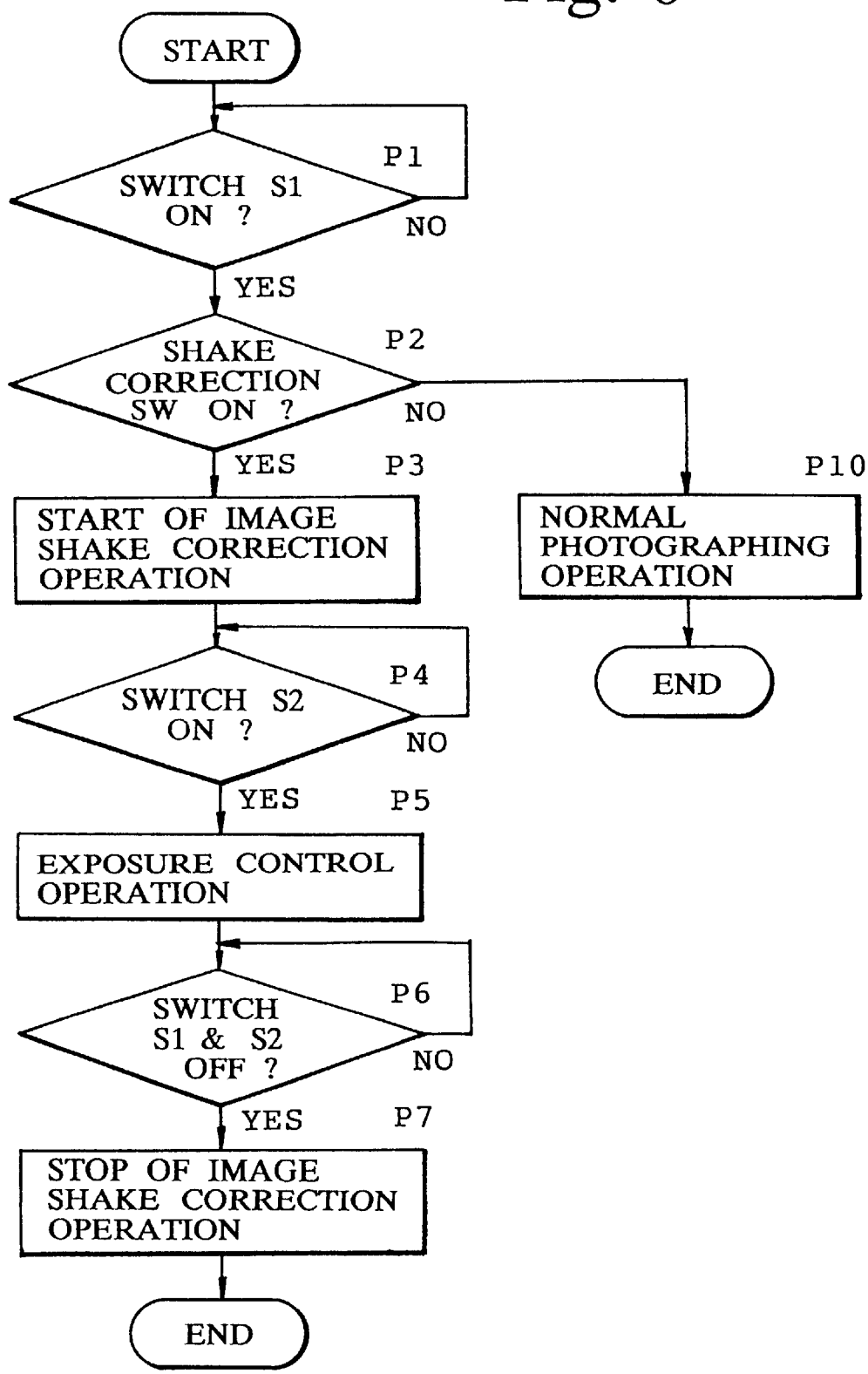
FIG. 6 is a flowchart for describing the control operation of the image shake correction optical unit in accordance with the first embodiment.

Next, the control operation of the correction optical unit driving mechanism performed in the CPU 21 is described with reference to the flowchart shown in FIG. 6. First, a signal, which is generated from the exposure controller 26 of the camera, which indicates ON of a switch S1 for indicating the starting of preparation for photograph taking activated by first step pushing down (half pushing down) of a shutter button has been waited (step P1), and when ON signal of the switch S1 is entered, whether the camera shake correction switch for selecting the correction of the camera shake is determined ON or not (step P2).

If the camera shake correction switch is ON, then an image shake correction operation is started. That is, when the magnitude of the shake in X-axis direction and Y-axis direction of the camera, namely a lens system, is detected, the CPU 21 calculates the correction magnitude required to correc t the image shake, namely the magnitude of the inclination angle (the inclination angle of the flat plates is the determinant of the refraction angle of the light which passes the correction optical unit 10) of the flat plates 11a and 11b, reads out a current value data for heating corresponding to the image shake correction magnitude stored in the memory unit 25, heats the shape memory alloy wires 16a and 16d through the heater driving units 23a to 23d, and starts the image shake correction operation (step P3).

The step indicated by the photographing starting switch S2 is waited (step P4) because an image shake correction operation has started. If a signal which indicates ON of the switch S2 is entered, then the exposure control operation is performed (step P5), an OFF signal of the switches S1 and S2 is waited (step P6), and if an OFF signal is detected, the photographing is determined to be finished and the currents supplied to the shape memory alloy wires 16a to 16d is shut off to stop the image shake correction operation (step P7), and the control sequence is brought to an end.

If the camera shake correction switch is not ON in the determination in step P2, a normal photographing sequence is performed (step P10) and the control sequence is brought to an end.

Based upon the above-mentioned description, in a case where the periphery of the holder frames 12a and 12b is divided into 90 degree angular intervals to introduce the orthogonal coordinate system having the optical axis coincident with Z-axis, the elastic members 15a and 15b and the shape memory alloy wires 16a and 16b are disposed on the plane including X-axis, and the elastic members 15c and 15d and the shape memory alloy wires 16c and 16d are disposed on the plane including Y-axis is described herein above. However, in another case where the periphery of the holder frames 12a and 12b is divided into three portions, the holder frames 12a and 12b are held by three elastic members and three shape memory alloy wires, and desired inclination direction and inclination angle (refraction angle) is set by selecting suitably three shape memory alloy wires may be employed.

The structure of the correction optical unit 10 is described herein above. The correction optical unit 10 is incorporated in the lens barrel which contains the principal optical system such as photographic lens as described herein and; many alternative structures maybe designed by applying the known means.

Second Embodiment

Figure 7:
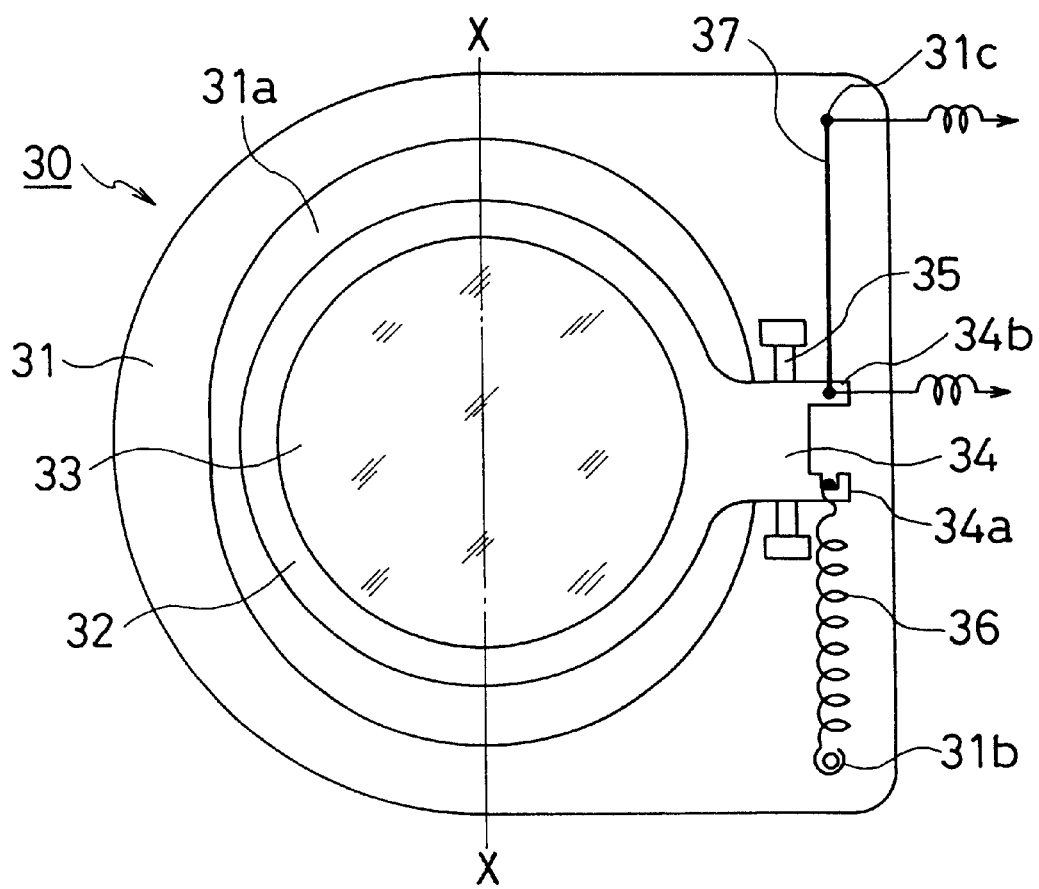
FIG. 7 is a plan view for illustrating the structure of an image shake correction optical unit in accordance with the second embodiment.

Next, the second embodiment is described. FIG. 7 is a plan view illustrating the structure of a correction optical unit 30 in accordance with the second embodiment. In FIG. 7, the structure for driving the correction lens in X-axis direction is shown, the same structure is provided in Y-axis direction, and thus the first correction lens which moves in X-axis direction and the second correction lens which moves in Y-axis direction are used combinedly, and a correction optical unit for correcting the image shake on XY-plane perpendicular to the optical axis is provided.

In FIG. 7, 31 denotes a fixed frame having an aperture 31a at the center, which is incorporated in a lens barrel of alenssystemnotshowninthedrawing. Aholderframe32which holds a correction lens 33 is located at the aperture 31a. An arm 34 is formed on one end of the holder frame 32, and the holder frame 32 is guided by a shaft 35 which is provided on the fixed frame 31 in X-axis direction and supported slidably in X-axis direction.

Further, an elastic member 36 such as a coil spring is provided between a pin 31b provided on the fixed frame 31 and a hook provided to the arm 34 of the holder frame 32, and a shape memory alloy wire 37 is provided between a pin 31cprovided on the fixed frame 31 and a pin 34b provided to the arm 34 of the holder frame 32.

A shrunk shape with a predetermined size has been memorized in the shape memory alloy wire 37 previously, when a current is supplied to the shape memory alloy wire to heat up to a predetermined temperature, the shape memory alloy wire is restored to the memorized shape. Because the size of shape memory alloy wire after restoration depends on the temperature, the temperature is controlled by controlling the current value to be supplied, and the magnitude of restoration of the shape memory alloy wire is controlled.

In the above-mentioned structure, the holder frame 32 is pulled downward in FIG. 7 by the elastic force of the elastic member 36, but a desired current is supplied to the shape memory alloy wire 37 for heating to cause a prescribed shrinking deformation, the shrinking deformation causes a force which lifts the holder frame 32 upward in FIG. 7. When the image shake correction is not activated, the downward pull force of the elastic member 36 balances the upward pull force of the shape memory alloy wire 37, and the holder frame 32 is positioned at the standby position of no image shake correction.

When an image shake correction starts, an electric current corresponding to the correction magnitude is supplied to the shape memory alloy wire 37. If the current value corresponding to the correction magnitude is larger than the predetermined current value which have been set when the above-mentioned holder:frame 32 is set at the standby position, the shrinking deformation length of the wire 37 is larger, and the holder frame 32 moves from the standby position in X-axis positive direction (wire 37 side). On the other hand, if the current value corresponding to the correction magnitude is smaller than the predetermined current value which has been set when the above-mentioned holder frame 32 is set at the standby position, the shrinking deformation length of the wire 37 is smaller, and the holder frame 32 moves from the standby position in X-axis negative direction (elastic member 36 side).

The driving mechanism for moving the correction lens in Y-axis direction is operated in the same manner as that in X-axis, and by combining two driving mechanisms, the image shake correction optical unit for correcting image shake on XY-plane perpendicular to the optical axis is structured.

The control circuit suitable for the structure in accordance the second embodiment is a control circuit similar to the control circuit used in the first embodiment shown in FIG. 5, and the control circuit for the second embodiment has the structure that, the heater driving unit shown in FIG. 5 is replaced with a heater driving unit for heating the shape memory alloy wire of X-axis direction driving mechanism and a heater driving unit for heating the shape memory alloy wire of Y-axis direction driving mechanism, and the control circuit is operated in the same manner as that of the above-mentioned first embodiment and the description is omitted.

Third Embodiment

Figure 8:
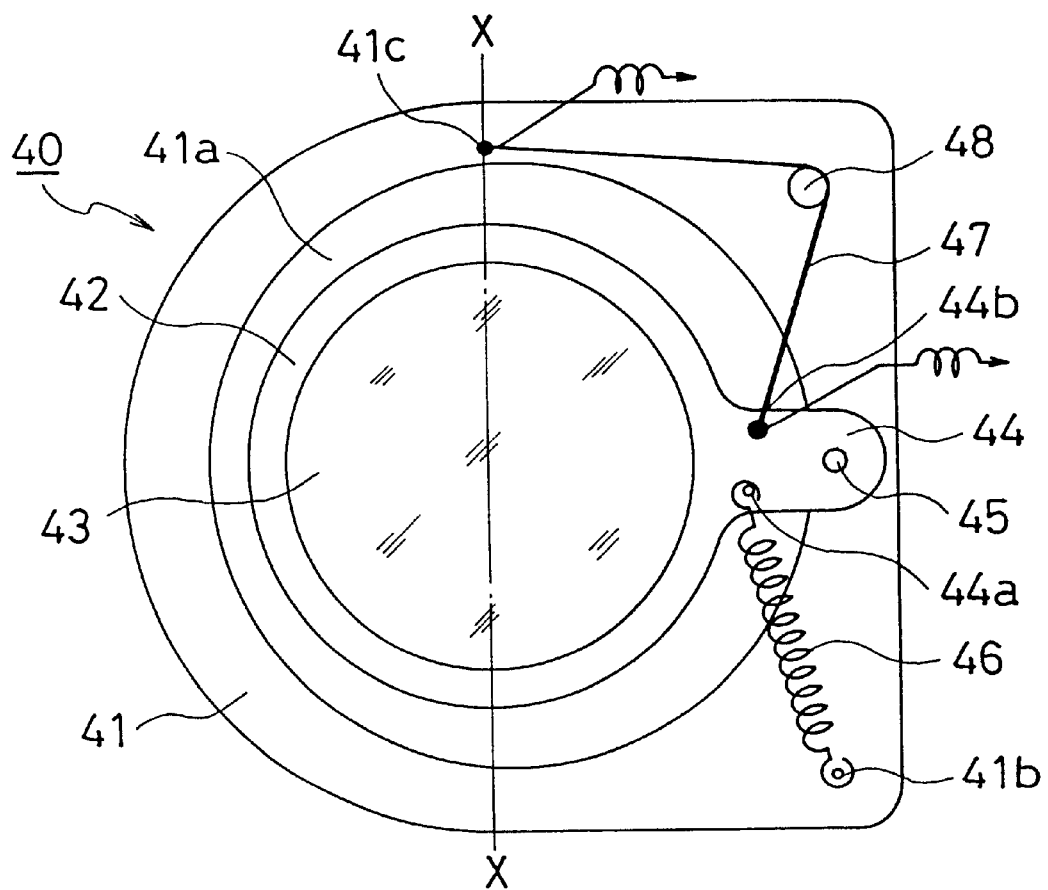
FIG. 8 is a plan view for illustrating the structure of an image shake correction optical unit in accordance with the third embodiment.

Next, the third embodiment is described. FIG. 8 is a plan view illustrating the structure of a correction optical unit 40 in accordance with the third embodiment, a correction lens is rotated around the axis which is positioned apart from the optical axis and parallel to the optical axis. Because the structure allows the first correction lens to be driven approximately in X-axis direction, the same structure is also provided also in Y-axis direction, and by combining the first correction lens which moves approximately in X-axis If direction and the second correction lens which moves approximately in Y-axis direction, a correction optical unit for correcting image shake on XY-plane perpendicular to the optical axis is provided.

In FIG. 8, 41 denotes a fixed frame having an aperture 41a at the center to be incorporated in a lens barrel of a lens system not shown in the drawing. A holder frame 42 which holds a correction lens 43 is located at the aperture 41a. An arm 44 is formed on one end of the holder frame 42, and supported rotatably by the shaft 45 which is provided on the fixed frame 41 and located in parallel to and apart from the optical axis.

Further, an elastic member 46 such as a coil spring is provided extendedly between a pin 41b provided on the fixed frame 41 and a pin 44a provided on the arm 44 of the holder frame 42, and a shape memory alloy wire 47 is provided extendedly between a pin 41c provided on the fixed frame 41 and a pin 44b provided on the arm 44 of the holder frame 42 by way of a pulley 48.

A shrink shape of a predetermined size has been memorized in the shape memory alloy wire 47 previously, when a current is supplied to the shape memory alloy wire to heat up to a predetermined temperature, the shape memory alloy wire is restored to the memorized shape. Because the size of shape memory alloy wire after restoration depends on the temperature, the temperature is controlled by controlling the current value to be supplied, and the magnitude of restoration of the shape memory alloy wire is controlled.

In the structure, the holder frame 42 is pulled rotatably in counterclockwise direction around the shaft 45 by the elastic force of the elastic member 46. On the other hand, a predetermined current is supplied to the shape memory alloy wire 47 for heating to cause a memorized predetermined shrink deformation; the holder frame 42 is pulled rotatably in clockwise direction round the shaft 45 by the shrinking force of the shape memory alloy wire 47, thus when image is not corrected, the pull force in counterclockwise direction exerted by the elastic member 46 balances the pull force in clockwise direction exerted by the shape memory alloy wire 47, and the holder frame 42 is positioned at the standby position no image shake correction.

When an image shake correction starts, an electric current corresponding to the correction magnitude is supplied to the shape memory alloy wire 47. If the current value corresponding to the correction magnitude is larger than the predetermined current value which have been set when the above-mentioned holder frame 42 is set at the stand by position, the shrinking deformation length of the wire 47 is larger, and the holder frame 42 rotates from the standby position in clockwise direction and moves approximately in X-axis positive direction (wire 47 side). On the other hand, if the current value corresponding to the correction magnitude is smaller than the predetermined current value which has been set when the above-mentioned holder frame 42 is set at the standby position, the shrinking deformation length of the wire 47 is smaller, and the holder frame 42 rotates from the standby position in counterclockwise direction and moves approximately in X-axis negative direction (elastic member 46 side).

The driving mechanism for moving the correction lens in Y-axis direction is operated in the same manner as that in X-axis, and by combining two driving mechanisms, the image shake correction optical unit for correcting image shake on XY-plane perpendicular to the optical axis is structured.

The control circuit suitable for the structure in accordance with the third embodiment is a control circuit similar to the control circuit used in the first embodiment shown in FIG. 5, and the control circuit for the second embodiment has the structure that the heater driving unit shown in FIG. 5 is replaced with a heater driving unit for heating the shape memory alloy wire of X-axis direction driving mechanism and a heater driving unit for heating the shape memory alloy wire of Y-axis direction driving mechanism, and the control circuit is operated in the same manner as that of the above-mentioned first embodiment and the description is omitted.

Fourth Embodiment

Figure 9:
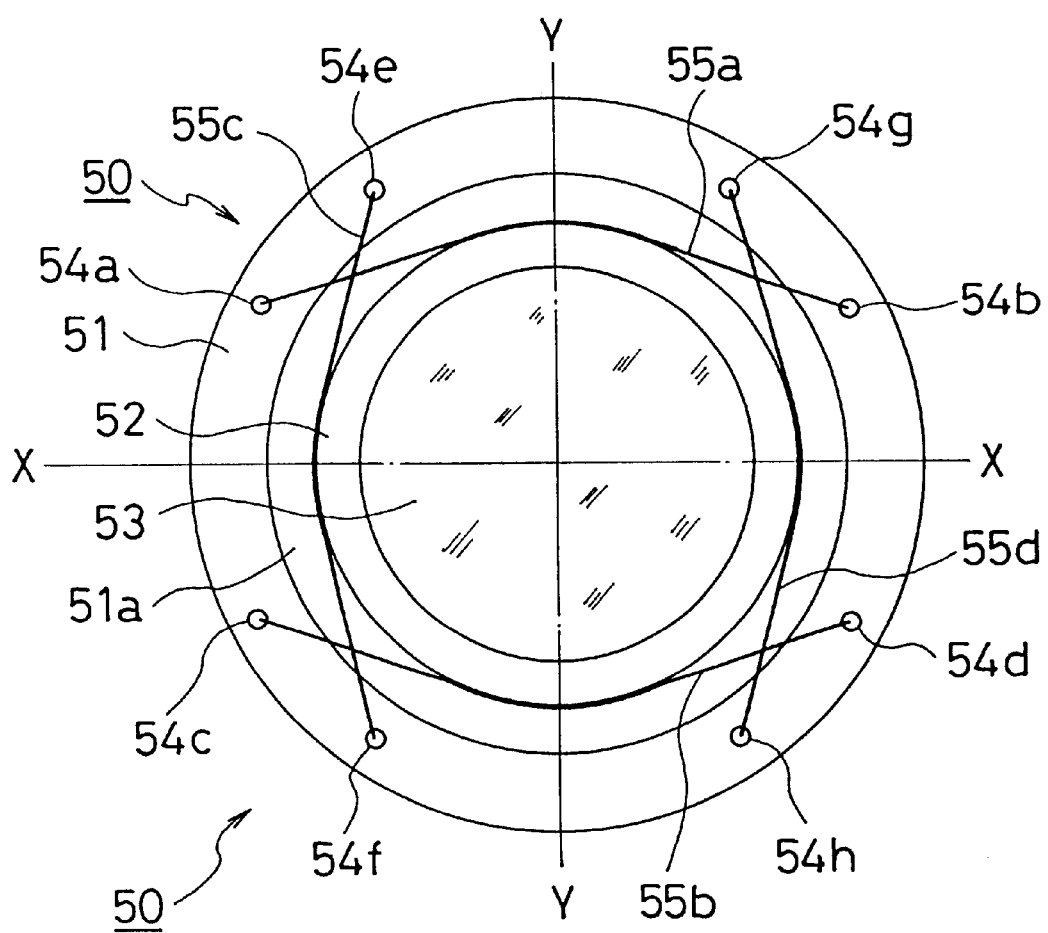
FIG. 9 is a plan view for illustrating the structure of an image shake correction optical unit in accordance with the fourth embodiment.

The fourth embodiment is described. FIG. 9 is a plan view illustrating the structure of an image shake correction optical unit 50 in accordance with the fourth embodiment, one unit can moves a correction lens simultaneously in X-axis direction and Y-axis direction.

In FIG. 9, 51 denotes a fixed frame having an aperture 51a at the center, and which is incorporated in a lens barrel of a lens system not shown in the drawing. A holder frame 52 which holds the correction lens 53 is located at the aperture 51a.

Pins 54a, 54b, 54c, and 54d are provided on the fixed frame 51 spaced apart the same distance from X-axis, and pins 54e, 54f, 54g, and 54h are provided on the fixed frame 51 spaced apart the same distance from Y-axis.

A shape memory alloy wire 55a is provided extendedly between the pins 54a and 54b. A ahape memory alloy wire 55b is provided extendedly between the pins 54c and 54d. A shape memory alloy wire 55c is provided extendedly between the pins 54e and 54f. A shape memory alloy wire 55d is provided extendedly between the pins 54g and 54h so that all the shape memory alloy wires surround the holder frame 52 which holds the correction lens 53. The respective wires are in contact with the holder frame 52 pressingly and function to set the holder frame 52 so that the center of the correction lens is located at the position coincident with the optical axis.

Because the memory shape and size have been previously memorized by the shape memory alloy wires 55a to 55d, when a current is supplied to turn shape memory alloy wires to heat to a predetermined temperature, the shape memory alloy wires are restored to the memory shape. Because the size of shape memory alloy wires after restoration depends on the temperature, the temperature is controlled by controlling the current value to be supplied, and the magnitude of restoration of the shape memory alloy wires is controlled.

In the above-mentioned structure, the condition in which a current is not supplied to the respective shape memory alloy wires for heating represents the standby condition, and in the standby condition, the holder frame 52 is located at the position where the center of the correction lens 53 is coincident with the optical axis. FIG. 9 shows this condition.

When an image shake correction starts, a current corresponding to the correction magnitude is supplied to the shape memory alloy wires 55a to 55d. When the correction lens 53 is wanted to be moved in X-axis positive direction (right direction in FIG. 9), a current is supplied to the shape memory alloy wire 55c for heating, the wire 55c is restored to the memory shape and shrinks against to the elastic force of the wire 55d, and the wire 55c is deformed to a form which is more approximate to a straight line. As the result, the wire 55c pushes the holder frame 52 in X-axis positive direction, and the correction lens 53 is moved in X-axis positive direction.

When the correction lens 53 is moved in X-axis negative direction (direction to the left in FIG. 9), a current is supplied to the shape memory alloy wire 55d in the same manner as described herein above, and the correction lens 53 is moved in X-axis negative direction.

Further, when the correction lens 53 is moved in Y-axis positive direction (upper direction in FIG. 9), a current is supplied to the shape memory alloy wire 55b for heating to push the holder frame 53 in Y-axis positive direction, and the correction lens 53 is moved in Y-axis positive direction. When the correction lens 53 is wanted to be moved in Y-axis negative direction (downward direction in FIG. 9), a current is supplied to the shape memory alloy wire 55a for heating to push the holder frame 53 in Y-axis negative direction, and the correction lens 53 is moved in Y-axis negative direction.

Figure 10:
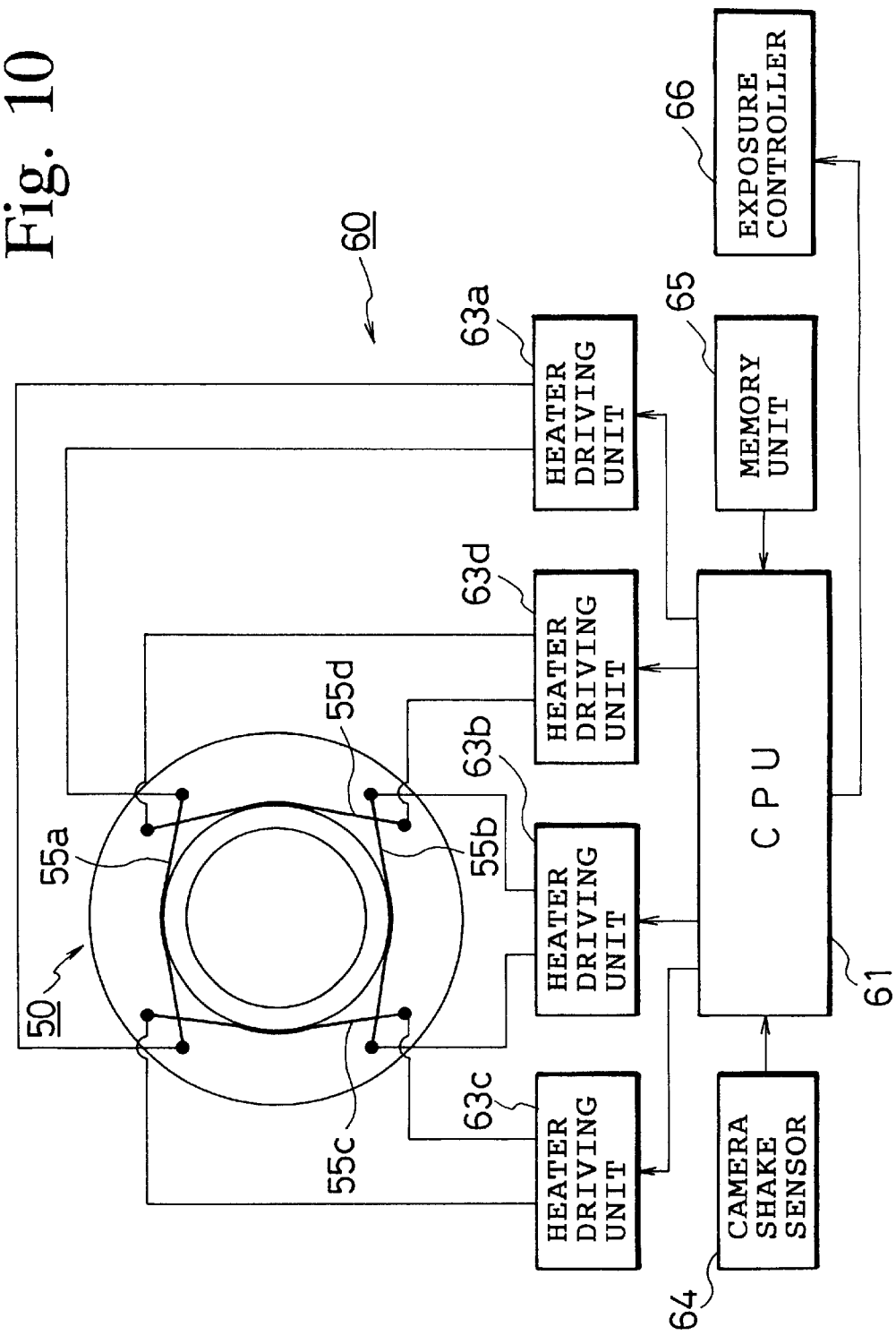
FIG. 10 is a block diagram for illustrating the structure of a ontrol circuit for controlling the image shake correction optical unit in accordance with the fourth embodiment.

FIG. 10 is a block diagram illustrating the structure of the control circuit 60 for controlling the correction optical unit. The control circuit 60 having a CPU 61 as the main component, a camera shake sensor 64, a memory unit 65, and an exposure controller 66 which are connected to the input/output port of the CPU 61 and heater driving units 63a to 63d for heating the respective shape memory alloy wires 55a to 55d are connected to the output port of the CPU 61.

Current value data for heating corresponding to the image shake magnitude is stored in the memory unit 65. The relation between the current value to be supplied to the shape memory alloy wire and the magnitude of the deformation length of the memorized shape is previously measured. Further the current value iB determined based on the image shake correction magnitude, e.g., the displacement of the correction lens.

The control circuit selects shape memory alloy wires 55a to 55d to be heated based on the image shake correction magnitude and direction detected by the camera shake sensor 64, and a current value corresponding to the image shake correction magnitude is determined from the memory data of the memory unit 65, and supplies an electric current to the selected shape memory alloy wire. Thus the correction lens is moved to the position for correcting the detected image shake, and the image shake is corrected.

Fifth Embodiment

The fifth embodiment is described. The fifth embodiment has a structure in which the image shake is corrected by inclining a correction lens with respect to the optical axis.

Figure 11:
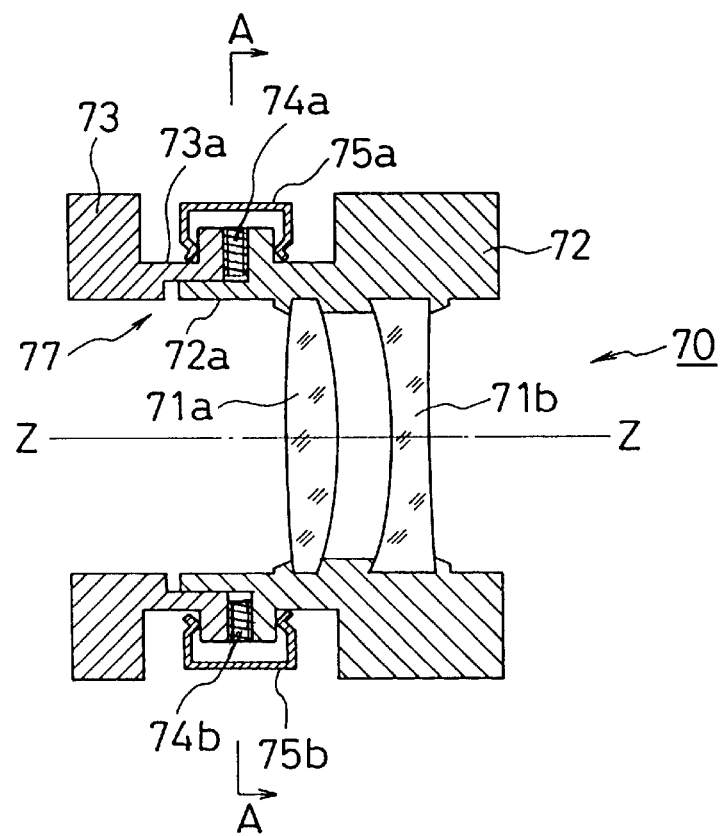
FIG. 11 is a cross sectional view for illustrating the structure of an image shake correction optical unit in accordance with the fifth embodiment.
Figure 12:
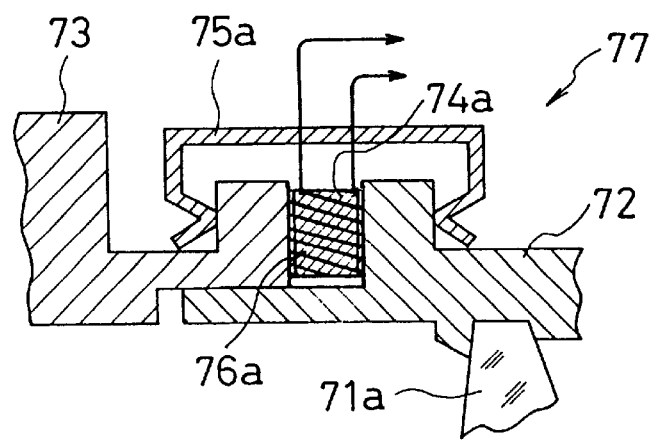
FIG. 12 is a partially enlarged view of the image shake correction optical unit shown in FIG. 11.
Figure 13:
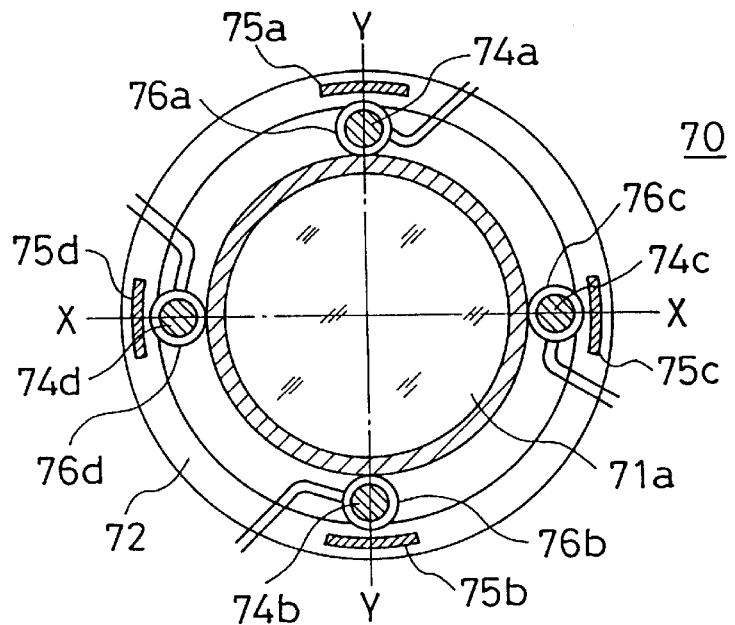
FIG. 13 is a cross sectional view along the line A—A of the image shake correction optical unit shown in FIG. 11.
Figure 14:
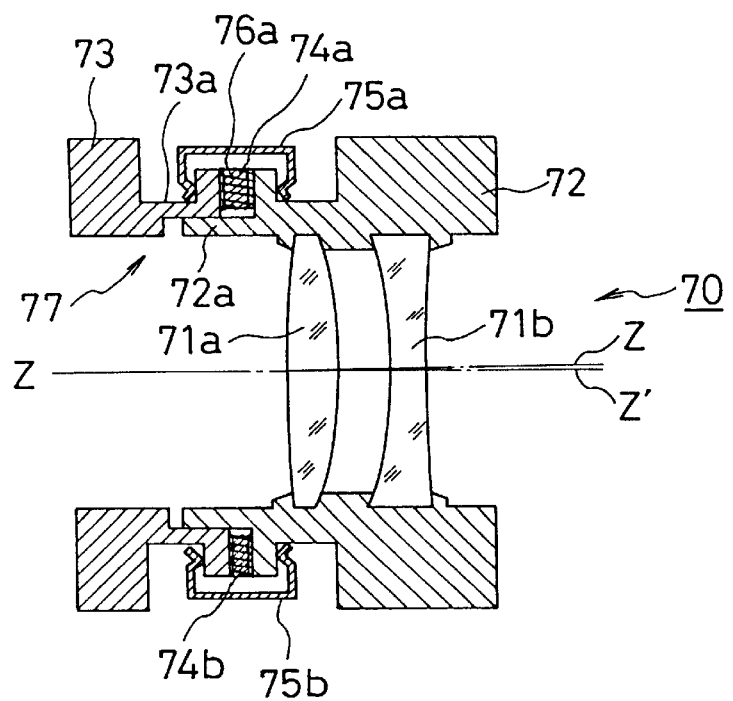
FIG. 14 is a cross sectional view for describing the inclined image shake correction optical unit shown in FIG.

FIG. 11 is a cross sectional view for illustrating the structure of a correction optical unit. FIG. 12 is an enlarged cross sectional view for illustrating the structure of an inclining mechanism of the correction optical unit, and FIG. 13 is a cross sectional view along the line A—A in FIG. 11. FIG. 14 is a cross sectional view for illustrating the inclined correction optical unit shown in FIG. 11.

In FIG. 11 to FIG. 14, a correction optical unit 70 is provided with a holder frame 72 for supporting correction lenses 71a and 71b and a fixed frame 73 mounted in a lens barrel not shown in the drawing, the holder frame 72 and the fixed frame 73 are engaged with a cylindrical engaging unit 77.

At positions corresponding to where the periphery of the engagina unit is divided into a plurality of angular intervals (for example, 90 degrees, 120 degrees), a plurality of driving members 74 (74a to 74d in the following description) iconsisting of shape memory alloy are inserted between the end face of a flange 72a formed on the end of the holder frame 72 and the end face of a flange 73a formed on the end of the fixed frame 73 in the engaging unit 77, and as the result the flange 72a and the flange 73a are pressed by a plurality of elastic members 75 (75a to 75d in the following description) such as U-shaped springs.

For the purpose of description, as shown in FIG. 13, the exemplary structure in which the engaging unit periphery is divided into 90 degree intervals and the orthogonal ordinate system-having the optical axis coincident with Z-axis is introduced, the driving members 74a and 74b consisting of shape memory alloy are located in Y-axis direction, and the driving members 74c and 74d consisting of shape memory alloy are located in X-axis direction is described.

A predetermined memory shape with a predetermined size has been memorized in the driving members 74a to 74d consisting of shape memory alloy. Heaters 76a to 76d are provided on the outside of the respective driving members 74a to 74d, when the heaters 76a to 76d heat the respective driving members 74a to 74d consisting of the shape memory alloy up to a predetermined temperature, the driving members 74a to 74d are B restored to the memory shape. Because the size of shape memory alloy after restoration depends on the temperature, the temperature is controlled by controlling the current value to be supplied, and the magnitude of restoration of the shape memory alloy wires is controlled.

In the above-mentioned structure, the condition in which no current is supplied to heaters 76a to 76d and the respective driving members 74a to 74d consisting of shape memory alloy are not heated and represents the standby condition. The holder frame 72 is not inclined with respect to the fixed frame 73, and the center of the correction lenses 71a and 71b is located at the position coincident with the optical axis.

When an image shake correction starts, an electric current is supplied to any one or two of the heaters 76a to 76d correspondingly to the correction magnitude to incline the holder frame 72 with respect to the fixed frame 73. For example, as shown in FIG. 14, in order to incline the incident light which hag passed the correction lens downward in Y-plane, a current is supplied to the heater 76a to heat the driving member 74a consisting of shape memory alloy. The driving member 74a is restored to the memory shape and the diameter increases (becomes larger in the optical axis direction), the upper side of the holder frame 72 is pushed out to the right side with respect to the fixed frame 73, and the incident light which has passed the correction lens is inclined downward in Y-axis plane.

The control circuit suitable for the structure in accordance the fifth embodiment has the same structure that, in the control circuit in accordance with the fourth embodiment shown in FIG. 10, the wires 55a to 55d consisting of shape memory ally are replaced with the heaters 76a to 76d, and the control circuit is operated in the same manner as that of the above-mentioned fourth embodiment, with and the description is omitted.

In the embodiments described, image shake correction driving mechanisms which utilize shape memory alloy for correction in either X-axis direction and Y-axis direction, actuators having other structures may be used together. For example, an image shake correction driving mechanism which utilizes a shape memory alloy may be used together with a driving mechanism which utilizes piezoelectric transducer, which is excellent for controllability. In this case, a driving mechanism which utilizes a piezoelectric transducer is used for driving in the direction in which image shake occurs more often and a driving mechanism which utilizes shape memory alloy is used for driving in the direction in which image shake occurs more seldom, thereby image shake is corrected more precisely and the driving mechanism is made compact and light-weight.

Figure 15:
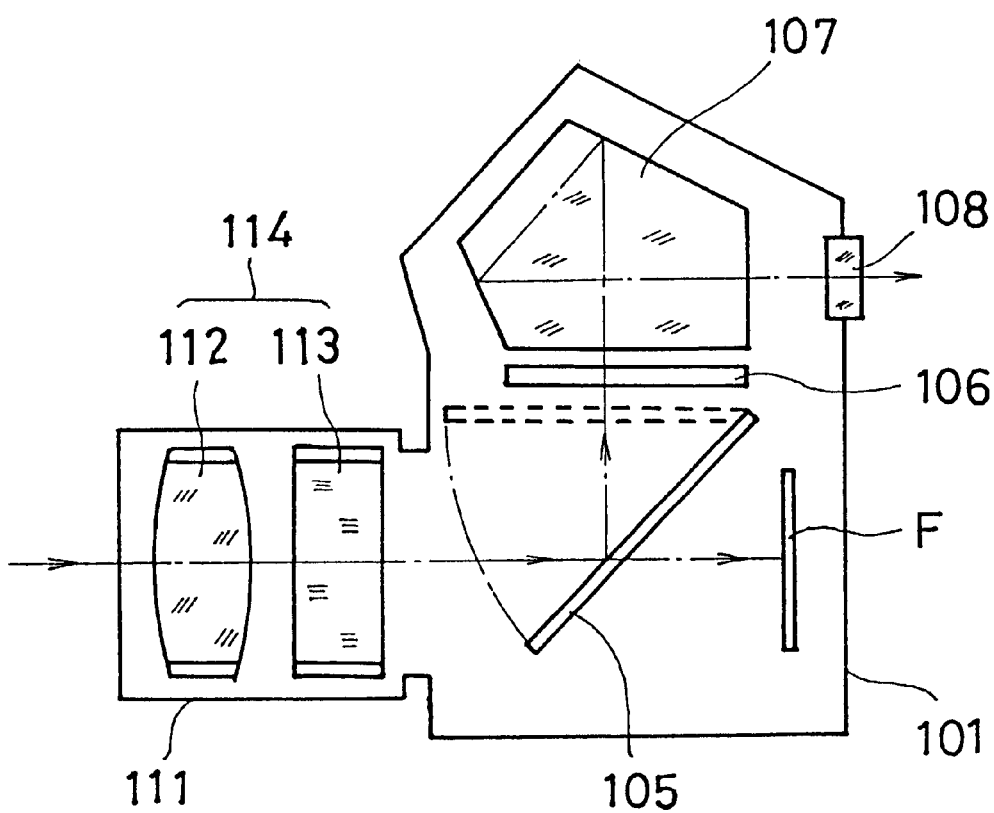
FIG. 15 is a cross sectional view for illustrating the structure of a camera provided with an image shake correction device disclosed in the embodiments.

FIG. 15 is a cross sectional view illustrating the structure of a camera which is provided with one of the image shake correction devices explained in the first through fifth embodiments. In FIG. 15, 101 denotes a camera body, 111 denotes a photographic lens barrel. The photographic lens barrel 111 accommodates a photographic lens 112 and an optical element 113 of an image shake correction device behind the photographic lens 112, and these components forms an optical system 114.

On the other hand, the camera body 101 accommodates a quick return mirror 105 in the optical path, a focusing plate 106, apenta prism 107, and an ocular lens 108, and the incident light which has passed through the optical system 114 is reflected from the quick return mirror 105 to form an object image on the focusing screen 106, and the object image is observed through the pentagonal prism 107 and eyepiece lens 108. A film F is located on the image forming plane behind the quick return mirror 105, the quick return mirror 105 is turned upward to allow the incident light which has passed to the optical system 114 to form an image on the film F for exposure.

An angular acceleration sensor, not shown in the drawing, is provided for detecting camera shake in the camera body 101, and when a shutter button is pushed, the optical element 113 for correcting image shake is driven by a driving mechanism, also not shown in the drawing, to correct image shake. Simultaneously when the shutter button is pushed, the quick return mirror 105 is lifted to allow the incident light which has passed to the optical system 114 to form an image on the film F, therefore the image shake on the focal plane is corrected even though the camera shake is caused in photographing, thus an object image is photographed without image shake.

As described herein, the image shake correction device for an optical apparatus of the present invention is provided with a correction optical element for correction in the optical path of the principal optical system for driving the correction optical element correspondingly to the detected image shake magnitude to correct the image shake on the image forming plane of an optical system. By employing the driving mechanism which utilizes a shape memory alloy for driving a correction lens for correcting the image shake, there is provided a compact light-weight image shake correction device, as opposed to a conventional image shake correction device having a driving mechanism which utilizes a piezoelectric transducer or moving coil for driving a correction lens.

What is claimed is:

1. An image shake correction device of an optical apparatus comprising:

an optical element in an optical path of a principal optical system, including a pair of flat plates being made of transparent material corresponding to an incident surface and an outgoing surface and a transparent fluid filler filled between said pair of flat plates and a sealer to seal said filler between said pair of flat plates;

a driving mechanism having at least one actuator which utilizes a shape memory alloy member to change an angle of at least one of said pair of flat plates with respect to an optical axis of the principal optical system of the optical apparatus and supporting said optical element, and said actuator maintaining a shape of said shape memory alloy member in a standby state to allow deformation both to a direction to restore the memorized original shape and to a counter direction to deform by an applied force when in a condition where the image shake is not corrected, and a temperature of said shape memory alloy member being controlled to a calculated temperature based on a detected shake magnitude of the optical apparatus for changing the shape to the memorized shape corresponding to the controlled temperature from said shape of said standby state.

2. An image shake correction device of an optical apparatus as claimed in claim 1, wherein said pair of flat plates is disposed perpendicularly to the optical axis of the principal optical system when not activated and inclined by a prescribed angle with respect to the optical axis of the principal optical system when activated.

3. An image shake correction device of an optical apparatus as claimed in claim 1, wherein a plurality of said actuators are provided on a periphery of each of said flat plates so as to connect said pair of flat plates at the peripheries.

4. An image shake correction device of an optical apparatus as claimed in claim 1, wherein said actuator functions to incline said pair of flat plates by a prescribed angle with respect to the optical axis of the principal optical system.

5. An image shake correction device of an optical apparatus as claimed in claim 1, wherein said driving mechanism is provided with an elastic member which exerts a pressing force in a direction to resist against a restoring force due to restoration of said actuator including shape memory alloy to a memorized shape.

6. An image shake correction device of an optical apparatus as claimed in claim 1, wherein said driving mechanism controls heating of said actuator including shape memory alloy to control a deformation length of said actuator.

7. An image shake correction device of an optical apparatus as claimed in claim 1, further comprising a control circuit for controlling a heating of the shape memory alloy by using current value data corresponding to an image shake magnitude.

8. An image shake correction device of an optical apparatus as claimed in claim 1, further comprising a force applying member applying a balancing force to said shape memory alloy member in the opposite direction opposed to a restoring force produced by a restoring deformation of the shape memory alloy in a condition where the image shake is not corrected.

9. An image shake correction device of an optical apparatus comprising:

a correction optical system in an optical path of a principal optical system;

a holder movable in a plane approximately perpendicular to an optical axis of the principal optical system for holding said correction optical system;

a first driving mechanism having an actuator which utilizes a shape memory alloy member to move said holder and fiuctions to move said holder in the plane approximately perpendicular to the optical axis of the principal optical system in a first direction and supporting said holder, and said actuator maintaining a shape of said shape memory alloy member in a standby state to allow deformation both to a direction to restore the memorized original shape and to a counter direction to deform by an applied force when in a condition where the image shake is not corrected, and a temperature of said shape memory alloy member being controlled to a calculated temperature based on a detected shake magnitude of the optical apparatus for changing the shape to the memorized shape corresponding to the controlled temperature from said shape of said standby state.

10. An image shake correction device of an optical apparatus as claimed in claim 9, wherein said first driving mechanism is provided with an elastic member which exerts a pressing force in a direction to resist against a restoring force due to restoration of said actuator consisting of shape memory alloy to a memorized shape.

11. An image shake correction device of an optical apparatus as claimed in claim 9, wherein said first driving mechanism controls heating of said actuator consisting of shape memory alloy to control a deformation length of said actuator.

12. An image shake correction device of an optical apparatus as claimed in claim 9, wherein said image shake correction device of the optical apparatus is further provided with a second driving mechanism, which moves said holder in a plane approximately perpendicular to the optical axis of the principal optical system in the second direction different from said first direction to correct an image shake.

13. An image shake correction device of an optical apparatus as claimed in claim 12, wherein said second driving mechanism is provided with an actuator which utilizes shape memory alloy to move said holder.

14. An image shake correction device of an optical apparatus as claimed in claim 12, wherein said second direction is approximately perpendicular to said first direction.

15. An image shake correction device of an optical apparatus as claimed in claim 12, wherein said correction optical system and holder comprises a first correction optical system and holder which move in said first direction and a second correction optical system and holder which move in said second direction.

16. An image shake correction device of an optical apparatus as claimed in claim 12, wherein said second driving mechanism is provided with an elastic member which exerts a pressing force in a direction to resist against a restoring force due to restoration of said actuator consisting of shape memory alloy to a memorized shape.

17. An image shake correction device of an optical apparatus as claimed in claim 12, wherein said second driving mechanism controls heating of said actuator consisting of shape memory alloy to control a deformation length of said actuator.

18. An image shake correction device of an optical apparatus as claimed in claim 9, further comprising a control circuit for controlling a heating of the shape memory alloy by using current value data corresponding to an image shake magnitude.

19. An image shake correction device of an optical apparatus as claimed in claim 9, further comprising a force applying member applying a balancing force to said shape memory alloy member in the opposite direction opposed to a restoring force produced by a restoring deformation of the shape memory alloy in a condition where the image shake is not corrected.

20. An image shake correction device of an optical apparatus as claimed in claim 19, wherein said force applying member is constructed of shape memory alloy.

21. An image shake correction device of an optical apparatus comprising:

a correction optical system in an optical path of a principal optical system;

a holder for supporting said correction optical system;

a first driving mechanism having a first actuator which utilizes a shape memory alloy member to move said holder and incline said holder around a first axis in a plane approximately perpendicular to an optical axis of the principal optical system and supporting said holder;

said first actuator maintaining a shape of said shape memory alloy member in a standby state to allow deformation both to a direction to restore the memorized original shape and to a counter direction to deform by an applied force when in a condition where the image shake is not corrected, and a temperature of said shape memory alloy member being controlled to a calculated temperature based on a detected shake magnitude of the optical apparatus for changing the shape to the memorized shape corresponding to the controlled temperature from said shape of said standby state;

a second driving mechanism having a second actuator which utilizes said shape memory alloy member to move said holder and incline said holder around a second axis, which is different from the first axis, in a plane approximately perpendicular to the optical axis of the principal optical system and supporting said holder; and said second actuator maintaining a shape of said shape memory alloy member in a standby state to allow deformation both to a direction to restore the memorized original shape and to a counter direction to deform by an applied force when in a condition where the image shake is not corrected, and a temperature of said shape memory alloy member being controlled to a calculated temperature based on a detected shake magnitude of the optical apparatus for changing the shape to the memorized shape corresponding to the controlled temperature from said shape of said standby state.

22. An image shake correction device of an optical apparatus as claimed in claim 21, wherein said second axis is disposed in a direction approximately perpendicular to said first axis.

23. An image shake correction device of an optical apparatus as claimed in claim 21, wherein said first driving mechanism is provided with an elastic member which exerts a pressing force in a direction to resist against a restoring force due to restoration of said actuator consisting of shape memory alloy to a memorized shape.

24. An image shake correction device of an optical apparatus as claimed in claim 21, wherein said first driving mechanism controls heating of said actuator consisting of shape memory alloy to control a deformation length of said actuator.

25. An image shake correction device of an optical apparatus as claimed in claim 21, further comprising a control circuit for controlling a heating of the shape memory alloy by using current value data corresponding to an image shake magnitude.

26. An image shake correction device of an optical apparatus as claimed in claim 21, further comprising a force applying member applying a balancing force to said shape memory alloy member in the opposite direction opposed to a restoring force produced by a restoring deformation of the shape memory alloy in a condition where the image shake is not corrected.

27. An optical apparatus with an image shake correction device comprising:
- a first optical system for capturing an optical image from an object;
- a second optical system for correcting a shake of the optical image taken from said first optical system; and
- a driving mechanism having an actuator which utilizes a shape memory alloy member for driving said second optical system and supporting said second optical system; and
- said actuator maintaining a shape of said shape memory alloy member in a standby state to allow deformation both to a direction to restore the memorized original shape and to a counter direction to deform by an applied force when in a condition where the image shake is not corrected, and a temperature of said shape memory alloy member being controlled to a calculated temperature based on a detected shake magnitude of the optical apparatus for changing the shape to the memorized shape corresponding to the controlled temperature from said shape of said standby state.

28. An optical apparatus provided with an image shake correction device as claimed in claim 27, wherein said driving mechanism is provided with an elastic member which exerts a pressing force in a direction to resist against a restoring force due to restoration of said actuator consisting of shape memory alloy to a memorized shape.

29. An optical apparatus provided with an image shake correction device as claimed in claim 27, wherein said driving mechanism comprises a first driving mechanism for driving said second optical system in a first direction and the second driving mechanism for driving said second optical system in a second direction which is different from the said first direction.

30. An optical apparatus provided with an image shake correction device as claimed in claim 27, wherein a first and second driving mechanisms control heating of said actuator consisting of shape memory alloy to control a deformation length of said actuator.

31. An optical apparatus provided with an image shake correction device as claimed in claim 27, further comprising a control circuit for controlling a heating of the shape memory alloy by using current value data corresponding to an image shake magnitude.

32. An optical apparatus provided with an image shake correction device as claimed in claim 27, further comprising a force applying member applying a balancing force to said shape memory alloy member in the opposite direction opposed to a restoring force produced by a restoring deformation of the shape memory alloy in a condition where the image shake is not corrected.

33. A method for correcting an image shake in an optical apparatus having an image shake correction system comprising:
  (1) detecting a shake magnitude in the optical apparatus;
  (2) calculating a magnitude of displacement of the correction optical system based on the detected shake magnitude of the optical apparatus;
  (3) maintaining a shape of a shape memory alloy member which is a component of a driving mechanism for driving the correction optical system in a standby state to allow deformation both to a direction to restore the memorized original shape and to a counter direction to deform by an applied force; and
  (4) controlling a temperature of the shape memory alloy member for driving the correction optical system to a determined temperature based on said calculation result.

34. A method for correcting an image shake in an optical apparatus having an image shake correction system comprising:
  (1) maintaining a shape of a shape memory alloy member which is a component of a driving mechanism for driving the image shake correction optical system in a standby state to allow deformation both to a direction to restore the memorized original shape and to a counter direction to deform by an applied force;
  (2) detecting a shake magnitude in the optical apparatus;
  (3) calculating a magnitude of displacement of the image shake correction optical system based on the detected shake magnitude of the optical apparatus;
  (4) defonning said shape memory alloy member for driving the image shake correction optical system to a determined temperature based on said calculation result; and
  (5) controlling a temperature of said shape memory alloy member by using current value data corresponding to the image shake magnitude.

* * * * *